Dec. 3, 1929.  G. H. ANDERSON  1,738,133
TOGGLE BOLT
Filed April 19, 1927
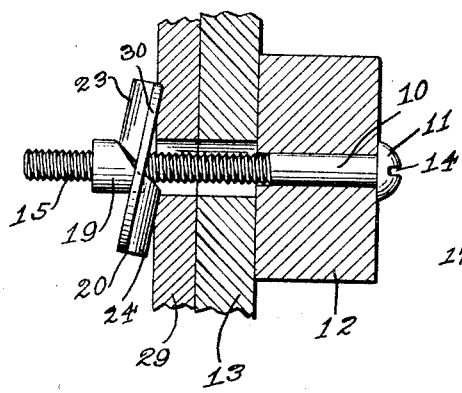
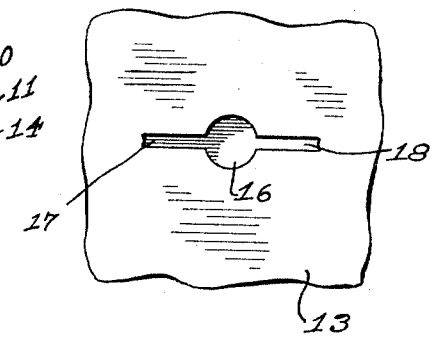
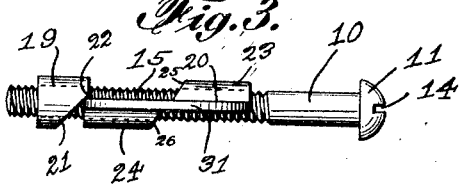
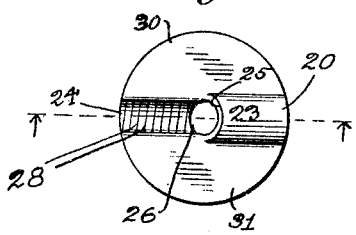
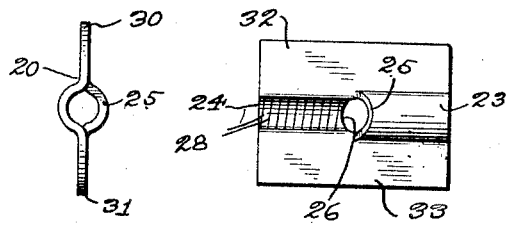
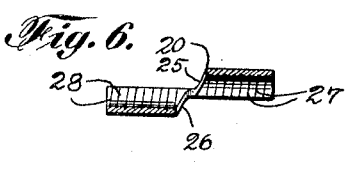
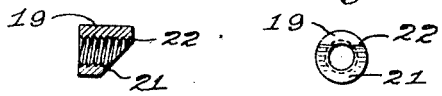
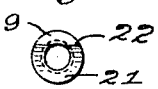
INVENTOR
Gustav Hilding Anderson
BY
H. G. Manning
ATTORNEY Patented Dec. 3, 1929

1,738,133

UNITED STATES PATENT OFFICE

GUSTAV HILDING ANDERSON, OF NEW BRITAIN, CONNECTICUT, ASSIGNOR TO THE HART & HUTCHINSON COMPANY, OF NEW BRITAIN, CONNECTICUT, A CORPORATION OF CONNECTICUT

TOGGLE BOLT

Application filed April 19, 1927. Serial No. 184,938.

This invention relates to toggle bolts, and more particularly to a toggle bolt having a relatively wide holding plate adapted to be twisted so that the bolt may be inserted through a slot in a wall.

A further object is to provide a toggle bolt of the above nature in which the holding plate comprises a substantially enlarged central portion provided with a pair of flat wings extending from either side thereof.

A further object is to provide a device of the above nature which will be simple in construction, easy to install and manipulate, compact, and very efficient and sturdy in use.

With these and other objects in view there have been illustrated on the accompanying drawings two forms in which the invention may be conveniently embodied in practice.

Fig. 1 represents a fragmentary sectional view showing an article supported upon a wall with the toggle bolt in clamping position.

Fig. 2 is a fragmentary front view of a portion of the wall showing the horizontal slot through which the toggle bolt is adapted to be inserted.

Fig. 3 is a side view of the toggle bolt shown in Fig. 1 as it appears in collapsed position ready to be inserted through the horizontal slot in the wall.

Fig. 4 is a plan view of the first form of holding member, showing the circular shape thereof.

Fig. 5 is an end view of the same.

Fig. 6 is a side sectional view of the same taken along the line 6—6 of Fig. 4 looking in the direction of the arrows.

Fig. 7 is a plan view of a modified form of holding member which is rectangular in shape.

Figs. 8 and 9 are sectional and end views respectively of one form of locking nut adapted to cooperate with the holding member.

Fig. 10 is a side view of a modified form of locking nut.

The present invention is in the art of toggle bolts, otherwise known as anchor bolts, plaster bolts, etc., which are used for securely holding articles upon the exterior surface of walls, ceilings, partitions, etc., where access to the inside of the wall is impossible or inconvenient.

In the previous types of toggle bolts the holding members for location in the rear of the wall have usually had only a relatively small bearing surface. The toggle bolts were also quite weak in construction owing to the fact that the holding members were generally pivoted to the locking nut mounted upon the toggle screw. On account of this small bearing surface and weak construction, when force was exerted upon the toggle bolt, the holding member was quite likely to pull through the opening in the plaster or wall, and often to rupture at the pivot joint.

By means of the present invention, the above and other disadvantages have been avoided by providing a holding member in the form of a flat plate with side wings of large bearing surface and in making said holding member entirely separate from the locking nut. By constructing the holding member separate from the locking nut, it is possible to make both the holding member and nut of generous proportions and to provide said nut with several complete strong threads.

Referring now to the drawings in which like reference numerals denote corresponding parts throughout the several views, the numeral 10 indicates a shank or toggle screw having a head 11 at one end adapted to engage the outer surface of an article 12 to be attached to a wall 13. The head 11 of the screw 10 is provided with a slot 14 for convenience of manipulation by a screw driver. The other end of the toggle screw is provided with screw threads 15 and is adapted to be inserted through a circular opening in the article 12, and an elongated opening in the wall 13. The wall opening comprises a central circular section 16 and a pair of alined oppositely extending side slots 17 and 18 for a purpose to be hereinafter described.

In order to cause the toggle screw 10 to clamp the article 12 firmly and securely upon the wall 13, provision is made of a cooperating cylindrical nut 19 and a flat holding member or plate 20. The nut 19 is truncated on its forward end to provide an inclined face 21 leaving a shoulder 22 for a purpose to be hereinafter described.

The holding member 20 comprises a stamped circular plate having an approximately round hole in the center to permit the toggle screw 10 to pass therethrough. Diametrically disposed with relation to the central hole are two semi-cylindrical channels 23 and 24 having the same diameter as the toggle screw 10 and extending in opposite directions from the plane of the holding plate 20. The channels 23 and 24 have their inner ends beveled to form inclined edges 25 and 26, as clearly shown in Fig. 6. By means of this construction, the screw 10 will be permitted to pass diagonally through the holding plate 20 to any desired adjusted position, and may also lie lengthwise in the channels 23 and 24 with its axis in the plane of said plate (see Fig. 3).

In order to cause the holding member 20 to frictionally engage the threaded portion 15 of the toggle screw 10 to prevent said plate from slipping when the toggle bolt is pushed through the wall aperture, the inner convex faces of the channels 23 and 24 are provided with inclined grooves or threads 27 and 28 as most clearly shown in Figs. 4 and 6. An extremely strong wide gripping surface upon the lath or plaster 29 or other material on the inside of the wall 13 will be afforded by the pair of oppositely extending substantially semi-circular flat wings 30 and 31 which are provided at the sides of said channel sections 23 and 24.

In operation, when it is desired to attach an article 12 to a wall, the threaded end 15 of the toggle screw is first inserted through the aperture, generally circular, in the article 12. The holding plate 20 and nut 19 are then placed upon the toggle screw 10 in the positions shown in Fig. 3, whereupon the toggle bolt will be inserted through the horizontal double keyhole slot in the wall. As soon as the holding plate has passed entirely through the wall 13 and lath 29, it will swing by gravity to the position shown in Fig. 1. This gravity effect is due to the fact that the holding plate 20 hangs eccentrically on the toggle screw 10. It will be understood, however, that the swinging of the holding plate into clamping position is not dependent upon the operation of gravity but said plate will be positively forced out laterally by the beveled face 21 of the nut 19. The operator will then rotate the toggle screw by means of a screw driver in the proper direction to force the clamping plate 20 into the lath 29. During this tightening operation, the nut 19 will enter the semi-cylindrical section of the holding plate until the inclined face 21 of the nut 19 engages the beveled edge 25 of the holding plate 20. The other beveled edge 26 of the holding plate will press from below into the threaded portion 15 of the toggle screw shank 10 and prevent any possibility of slippage. As the tightening operation continues, the nut 19 will move forwardly on said screw, forcing the holding plate 20 tightly into the lath 29. In view of the width of the holding plate and strength of the nut construction, there will be no possibility of bending or collapsing of these parts.

The modified form of holding plate shown in Fig. 7 is identical with the first form except that its flat side wings 32 and 33 are rectangular instead of semi-circular in outline. This form of holding plate may be inserted through a wall opening of the same size and shape as the circular form of plate and affords an even greater clamping surface.

In the modified form of locking nut 34 shown in Fig. 10, the inclined face 35 is beveled off on both sides to provide inclined facets 36. This construction permits the nut 34 to enter more deeply into the semi-cylindrical section 24 of the holding member and thus produces an even more secure locking effect.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a toggle bolt, a threaded shank having a head, a disc-like holding plate loosely mounted on said shank, said plate having a pair of beveled sections on opposite sides thereof, and a nut threaded on said shank and having a beveled portion interlocking with said holding plate, said plate having a pair of flat side wings to afford a wide clamping surface, whereby when the head of said shank is turned, said plate will be positively rocked transversely into holding position.

2. In a toggle bolt adapted to be inserted through an elongated slot in a wall, a threaded shank having a head for engaging the outside of an apertured article to be held upon said wall, a disc-like flat holding plate slidable along said shank, said plate having a beveled section on one face, and a nut on said shank having a beveled portion for interlocking engagement with said holding plate, whereby when the head of said shank is turned, said plate will be positively rocked transversely into holding position.

3. In a toggle bolt, a shank adapted to be inserted through a horizontal aperture in a wall for supporting an article thereon, said shank having an exterior head for engaging said article and being threaded on its inner end, a flat holding member slidably mounted on said shank, and a locking nut on said shank, said holding member and locking nut having cooperating inclined faces for nonrotative interlocking engagement, whereby when the head of said shank is turned, said plate will be positively rocked transversely into holding position.

In testimony whereof, I have affixed my signature to this specification.

GUSTAV HILDING ANDERSON.